United States Patent [19]
Ledon et al.

[11] Patent Number: 5,961,947
[45] Date of Patent: Oct. 5, 1999

[54] PROCESS FOR THE PREPARATION OF AN ULTRA PURE HYDROGEN PEROXIDE SOLUTION BY THE ION EXCHANGE BY SEQUENCE: ANIONIC-CATIONIC-ANIONIC-CATIONIC

[75] Inventors: Henry Ledon; Martine Carre, both of Versailles; Didier Demay, Saint-Remy; Christine Devos, Versailles; Serge Jeanin, Massy, all of France

[73] Assignee: L'Air Liquide, Societe Anonyme pour l'Etude et l'Exploitation des Procedes Georges Claude, Paris, France

[21] Appl. No.: 08/867,961

[22] Filed: Jun. 3, 1997

[30] Foreign Application Priority Data

May 27, 1997 [FR] France .................................... 97 06470

[51] Int. Cl.$^6$ .................................................... C01B 15/01
[52] U.S. Cl. .............................................................. 423/584
[58] Field of Search ............................................... 423/584

[56] References Cited

U.S. PATENT DOCUMENTS 3,074,782  1/1963  Meeker et al. .
3,618,589  11/1971  Tavani .
4,999,179  3/1991  Sugihara et al. ........................ 423/584
5,733,521  3/1998  Minamikawa et al. ................. 423/584

FOREIGN PATENT DOCUMENTS 774442    10/1996   European Pat. Off. .
51025     8/1965    Germany .
WO96/39237  12/1996  WIPO .

*Primary Examiner*—Wayne Langel
*Attorney, Agent, or Firm*—Burns, Doane, Swecker & Mathis, L.L.P.

[57] ABSTRACT

Provided is a process for the preparation of an ultrapure hydrogen peroxide solution. The process comprises at least one sequence which includes successively passing a solution to be purified through at least two beds of cation-exchange adsorbents (CEA) and two beds of anion-exchange adsorbents (AEA) according to the sequence:

$$AEA \rightarrow CEA \rightarrow AEA \rightarrow CEA$$

Also provided is a plant for the implementation of the inventive process.

9 Claims, No Drawings

PROCESS FOR THE PREPARATION OF AN ULTRA PURE HYDROGEN PEROXIDE SOLUTION BY THE ION EXCHANGE BY SEQUENCE: ANIONIC-CATIONIC-ANIONIC-CATIONIC

BACKGROUND OF THE INVENTION

1. Field of the Invention

The invention relates to a process for the preparation of an ultra pure hydrogen peroxide solution, and to a plant for the implementation of the process.

2. Description of the Related Art

The use of hydrogen peroxide for advanced technology applications or applications in the food industry, in hygiene or health requires increasingly pure products which must meet a growing number of increasingly tight specifications. In particular, the demands of users are turning towards hydrogen peroxide solutions in which the content of each metal impurity is less than one part per billion (ppb) and preferably less than 100 parts per trillion (ppt). In the following account, such solutions will be known as ultrapure hydrogen peroxide solutions.

It is well known, according to the prior art, that it is possible to remove certain impurities by passing the solution through a bed of ion-exchange adsorbents. Mention may be made, for example, of functionalized polymers of polystyrene/divinylbenzene type, silicas or aluminosilicates, in particular the varieties containing controlled micropores, such as zeolites, or active charcoals; these solids carry functional groups capable of complexing either cations or anions. Mention may be made, as examples of functional groups capable of complexing cations, of the carboxylic, sulphonic, phosphonic, hydroxide, amine oxide or phosphine oxide groups or alternatively of cyclic or open polyoxaalkyls, such as, for example, ethylene oxide polymers. Mention may be made, as examples of functional groups capable of complexing anions, of the quaternary ammonium or quaternary phosphonium groups. These adsorbents can also be obtained by polymerization of a monomer carrying a functional group, for example poly (methacrylic acid)s, poly(vinylphosphonic acid)s, polyvinylpyridines, polyvinylpyrrolidones, poly(vinyl alcohol)s, saponified polylactones and copolymers containing these units. The adsorbents which are the most often described are polystyrene gels or crosslinked polystyrenes possessing sulphonic—$SO_3H$ or trimethylammonium $(CH_3)_3N^+$—functional groups.

Many combinations have been provided, such as, for example, anionic resin followed by cationic resin or cationic resin followed by anionic resin or alternatively anionic resin followed cationic resin followed by cationic+anionic "mixed bed". Additions to the inter-stage phases are also described, such as, for example, the addition of acid in order to modify the pH or the addition of chelating agents, such as aminomethylenecarboxylic or aminomethylenephosphonic derivatives.

It is well known to the person skilled in the art that the use of anion-exchange adsorbents presents great difficulties when employed for the purification of hydrogen peroxide. In particular, the hydroxide form, under which these products are generally available industrially, cannot be used directly because of its excessively high basicity, resulting in significant decomposition of hydrogen peroxide. Many publications describe the use of adsorbents exchanged by carbonate or bicarbonate ions, which are less basic, in order to limit the decomposition of hydrogen peroxide, without, however, eliminating it completely.

It is essential to be able to control this phenomenon of decomposition of hydrogen peroxide on adsorbent beds because, as this decomposition with release of gaseous oxygen is exothermic, the rate is accelerated according to the well known Arrhenius law. The formation of a gas pocket can further aggravate the phenomenon since, by separating the liquid from the decomposition point, the heat released can no longer be removed by evaporation of the water and the cooling effect of the liquid is lost. Such a process is characteristic of a divergent reaction which can result in an extremely violent autoaccelerated decomposition reaction, which is all the more dangerous since it is highly exothermic and produces gaseous oxygen, thus with a considerable expansion force which can cause explosions.

SUMMARY OF THE INVENTION

The present invention relates to a process for the purification of an ultrapure hydrogen peroxide solution, characterized in that it comprises at least one sequence which includes successively passing the said solution through at least four beds of cation-exchange adsorbents (CEA) and of anion-exchange adsorbents (AEA) according to the sequence:

AEA → CEA → AEA → CEA.

DETAILED DESCRIPTION OF THE PREFERRED EMBODIMENTS OF THE INVENTION

The hydrogen peroxide solution to be purified according to the present invention, originating from a technical solution, has a concentration of 1 to 70% by weight and preferably of 5 to 50% by weight. The adsorbents are chosen from those which are described above.

The beds of adsorbents exhibit a height/diameter ratio of between 0.5 and 100, in particular between 1 and 50. In a first preferred alternative form, the subject of the present invention is the process as defined above in which the beds of adsorbents each exhibit a height to diameter ratio of greater than 3 and in particular of between 5 and 10 and, more particularly, of approximately 6.

The anion-exchange adsorbents are preferably fed in an upward mode, whereas the cation-exchange adsorbents are preferably fed in a downward mode. However, it is also possible to operate in a completely gravitational mode in which all the beds operate in an upward mode.

The hydrogen peroxide solution throughputs, expressed as volume of solution/hour passed per volume of bed of adsorbent, generally vary between 0.5 and 100, preferably from 1 to 50 and more particularly from 10 to 30.

It is possible to define the geometries of the beds so that the true space velocities and/or throughputs in each adsorbent are optimized. In a specific configuration, a high space velocity is applied during the passage of the solution in the first sub-sequence AEA → CEA and a low space velocity during the passage in the second sub-sequence AEA → CEA.

It is also possible to operate under pressure; a working pressure of less than 5 atm above atmospheric pressure will preferably be chosen.

The temperature of the solution to be purified according to the process as described above is less than or equal to 30° C. and preferably between −10° C. and +10° C.

In an alternative form of the process as defined above, it comprises, upstream or downstream of sequences for passing the solution to be purified through the beds of ion-exchange adsorbents, one or more purification stages, such as, for example, distillation, liquid extraction, crystallization, absorption, filtration, ultrafiltration, nanofiltration or reverse osmosis. If appropriate, the starting solution is brought beforehand to the desired assay and then purified.

Depending on the degree of purity and of dilution of the hydrogen peroxide solution to be purified, one or more of these additional stages is/are employed.

In a second preferred variant of the present invention, the technical hydrogen peroxide solution to be purified, which is at a concentration of 30% to 70% by weight, is distilled and brought to the desired assay beforehand and then purified according to the sequence which is the subject of the present invention.

According to a third alternative form of the purification process which is the subject of the present invention, a hydrogen peroxide solution of technical quality or of so-called "food" quality, having a concentration of approximately 50 to 70% by weight, is subjected to the following pretreatment: a first distillation/concentration stage, in order to obtain a condensate having a concentration of greater than 80%, plus a first purification by low-temperature crystallization and the removal of the supernatant. The crystals collected are washed, superficially dried and then melted and the solution obtained is diluted to 30 or 35% with deionized water of ultrapure electronic quality. After the said pretreatment, the resulting solution is purified using the sequence which is the subject of the present invention.

Another subject of the invention is a plant for the implementation of the process as defined above.

In a preferred alternative form of the present plant, the beds of anion-exchange adsorbents are fed in upward mode and the beds of cation-exchange adsorbents are fed in downward mode.

In another preferred alternative form of the plant, the latter is situated on the customer's site, such as, for example, a site for the manufacture of electronic components, and connected directly to the point of use of the hydrogen peroxide by the customer.

The following examples illustrate the invention without, however, limiting it.

EXAMPLES a) Comparative Example

A technical hydrogen peroxide solution is distilled under partial vacuum and diluted with ultrapure water in order to bring its assay to 30% by weight, to obtain a solution A. The latter is then purified by passing through a column of anion-exchange resin Dowex Monosphere A 550 UPE, exchanged in the bicarbonate form, and then through a column of cation-exchange resin Dowex Monosphere C 650 UPN, to give a solution B. Analysis of the contaminants present in the solutions A and B gives the following results (concentrations expressed in ppt):

|    | Solution A   | Solution B |
|----|--------------|------------|
| Na | 15,000       | 70 to 150  |
| Sn | 2000 to 5000 | 60 to 120  |
| Al | 1000 to 3000 | 25 to 70   |

-continued

|    | Solution A   | Solution B |
|----|--------------|------------|
| Fe | 100 to 300   | 40 to 100  |
| Ca | 500 to 5000  | 25 to 100  | b) Example According to the Invention

A technical hydrogen peroxide solution identical to that in the preceding example is diluted to 30% with ultrapure water and passed successively through an anion-exchange resin and a cation-exchange resin under the same conditions as those in the comparative example. The solution C is obtained. The solution C is subjected to a new purification cycle by passing through an anion-exchange resin and a cation-exchange resin, to give the final solution D. Analysis of the contaminants present in the solutions C and D gives the following results (concentrations expressed in ppt):

|    | Solution C   | Solution D |
|----|--------------|------------|
| Na | 100          | 40         |
| Sn | 2000 to 8000 | 150        |
| Al | 1000 to 4000 | 150        |
| Fe | 100 to 500   | 50         |
| Ca | 100 to 500   | 50         |

It is thus possible, according to the present invention, very easily to obtain, from an ordinary technical quality, a hydrogen peroxide solution of "electronic" quality containing less than 200 ppt of each of the metal cations from groups IA to VIII of the table of the Periodic Classification of the Elements.

The process according to the present invention dispenses with the distillation stage, which is expensive in terms of direct labour and investment and presents a high potential risk.

What is claimed is:

1. A process for the preparation of an ultrapure hydrogen peroxide solution, comprising at least one sequence which includes successively passing a hydrogen peroxide solution to be purified through at least two beds of cation exchange adsorbents (CEA) and at least two beds of anion-exchange adsorbents (AEA) according to the sequence:

AEA → CEA → AEA → CEA.

2. The process according to claim 1, wherein each of said beds of anion-exchange adsorbents and cation-exchange adsorbents exhibits a height to diameter ratio of greater than 3.

3. The process according to claim 2, wherein each of said beds of anion-exchange adsorbents and cation-exchange adsorbents exhibits a height to diameter ratio of between 5 and 10.

4. The process according to claim 3, wherein each of said beds of anion-exchange adsorbents and cation-exchange adsorbents exhibits a height to diameter ratio of approximately 6.

5. The process according to claim 1, further comprising, upstream or downstream of the at least one sequence, one or more purification stages, and optionally, a prior operation in which said solution to be purified is brought to a desired concentration.

6. The process according to claim 5, wherein the one or more purification stages are selected from the group consisting of distillation, liquid extraction, crystallization, absorption, filtration, ultrafiltration, nanofiltration and reverse osmosis.

7. The process according to claim 1, wherein the solution to be purified is a technical hydrogen peroxide solution at a concentration of 30% to 70% by weight, said solution being distilled and brought to a desired concentration in a prior operation.

8. The process according to claim 1, wherein the solution to be purified is a technical quality or food quality hydrogen peroxide solution at a concentration of approximately 50 to 70% by weight, said solution being subjected to a pretreatment as follows:

- a distillation/concentration stage to obtain a condensate having a concentration of greater than 80%;
- purification of the condensate by low-temperature crystallization and removal of a supernatant;
- collecting, washing, superficially drying and melting the obtained crystals; and
- diluting the melted crystals to 30 to 35% with deionized water of ultrapure electronic quality.

9. The process of claim 1, wherein the hydrogen peroxide solution space velocity in the first sub-sequence AEA → CEA is higher than the hydrogen peroxide solution space velocity in the second sub-sequence AEA → CEA.

* * * * *